United States Patent
Kamal et al.

(10) Patent No.: US 9,704,160 B2
(45) Date of Patent: Jul. 11, 2017

(54) TRUSTED EXECUTION ENVIRONMENT FOR TRANSPORT LAYER SECURITY KEY PAIR ASSOCIATED WITH ELECTRONIC COMMERCE AND CARD NOT PRESENT TRANSACTIONS

(71) Applicant: MasterCard International Incorporated, Purchase, NY (US)

(72) Inventors: Ashfaq Kamal, White Plains, NY (US); Gregory D. Williamson, Stamford, CT (US); Bob Reany, Stamford, CT (US)

(73) Assignee: MasterCard International Incorporated, Purchase, NY (US)

( * ) Notice: Subject to any disclaimer, the term of this patent is extended or adjusted under 35 U.S.C. 154(b) by 82 days.

(21) Appl. No.: 14/492,337

(22) Filed: Sep. 22, 2014

(65) Prior Publication Data

US 2016/0086172 A1 Mar. 24, 2016

(51) Int. Cl.
*G06Q 20/32* (2012.01)
*G06Q 20/40* (2012.01)
(Continued)

(52) U.S. Cl.
CPC ......... *G06Q 20/3829* (2013.01); *G06F 21/62* (2013.01); *G06Q 20/24* (2013.01);
(Continued)

(58) Field of Classification Search
CPC .... G06Q 20/3829; G06Q 20/24; G06Q 20/26; G06Q 20/322; G06Q 20/3226;
(Continued)

(56) References Cited

U.S. PATENT DOCUMENTS

| 2011/0083173 A1* | 4/2011 | Baghdasaryan | ....... G06Q 20/10 726/7 |
| 2014/0058951 A1* | 2/2014 | Kuppuswamy | ...... G06Q 20/223 705/67 |

(Continued)

FOREIGN PATENT DOCUMENTS

WO 2012167352 A1 12/2012

OTHER PUBLICATIONS

PCT Search Report and Written Opinion dated Dec. 17, 2015 issued by the International Searching Authority in corresponding Application No. PCT/US15/51187, 9 pages.

*Primary Examiner* — Suezu Ellis
(74) *Attorney, Agent, or Firm* — Buckley, Maschoff & Talwalkar LLC

(57) ABSTRACT

According to some embodiments, a requesting application executing on a mobile device may request a transport layer security key pair in connection with a payment transaction. Responsive to the request, a trusted execution environment client of the mobile device may route a request to a payment application executing in a secure trusted execution environment of the mobile device. It may then be arranged, within the secure trusted execution environment, to create the transport layer security key pair and provide key pair to the requesting application. Moreover, in some embodiments, the mobile device may transmit payment transaction information to an access control server and receive a request for biometric authentication. It may then be arranged for hardware within the mobile device to biometrically authenticate a user of the mobile device.

23 Claims, 8 Drawing Sheets

(51) Int. Cl.
*G06Q 20/38* (2012.01)
*G06Q 20/22* (2012.01)
*G06F 21/62* (2013.01)
*G06Q 20/24* (2012.01)
*G06Q 20/26* (2012.01)

(52) U.S. Cl.
CPC ............ *G06Q 20/26* (2013.01); *G06Q 20/322* (2013.01); *G06Q 20/3227* (2013.01); *G06Q 20/40145* (2013.01)

(58) Field of Classification Search
CPC ........ G06Q 20/3227; G06Q 20/40145; H04W 12/04; H04W 12/06; H04N 21/26613; H04N 21/6334; H04N 21/63345; G06F 21/62; G06F 2211/007; G06F 2211/008; H04L 29/06673; H04L 29/06707; H04L 29/06714
USPC .................................................. 235/380, 375
See application file for complete search history.

(56) References Cited

U.S. PATENT DOCUMENTS

| | | | |
|---|---|---|---|
| 2014/0090039 A1* | 3/2014 | Bhow | H04W 12/06 726/7 |
| 2014/0172721 A1 | 6/2014 | Weiss et al. | |
| 2014/0282978 A1 | 9/2014 | Lerner et al. | |
| 2015/0363774 A1* | 12/2015 | Priebatsch | G06Q 20/3829 705/75 |
| 2016/0080326 A1* | 3/2016 | Brand | H04L 63/0428 713/155 |
| 2016/0080338 A1* | 3/2016 | Wary | G06F 21/44 713/171 |
| 2016/0103675 A1* | 4/2016 | Aabye | G06F 8/65 717/170 |
| 2016/0140545 A1* | 5/2016 | Flurscheim | G06Q 20/3821 705/76 |

* cited by examiner

TRUSTED EXECUTION ENVIRONMENT FOR TRANSPORT LAYER SECURITY KEY PAIR ASSOCIATED WITH ELECTRONIC COMMERCE AND CARD NOT PRESENT TRANSACTIONS

BACKGROUND

A mobile device may exchange information with another device, such as a merchant device, in connection with a purchase transaction. For example, a user might interact with a smartphone application, and, as a result, the smartphone might transmit the user's credit card number and associated information to a merchant device to complete an online transaction. Because of the sensitive nature of the information being exchanged between the mobile device and the merchant device, the mobile device may include a Transport Layer Security ("TLS") server to improve security. TLS is a cryptographic protocol that improves communication security over a network, such as the Internet, using certificates and key pairs to encrypt information.

In some cases, however, it is known that the security of a TLS server may be unknowingly compromised by malicious software. To keep communications between a mobile device and a merchant device secure, an "out of band" verification process can be implemented. For example, the user might need to place a telephone call to the merchant and provide a password. Such an approach, however, can be time consuming on inconvenient for users and may be impractical for some applications. As a result, systems and methods to improve security for mobile devices and/or online transactions may be desired.

DETAILED DESCRIPTION

Figure 1:
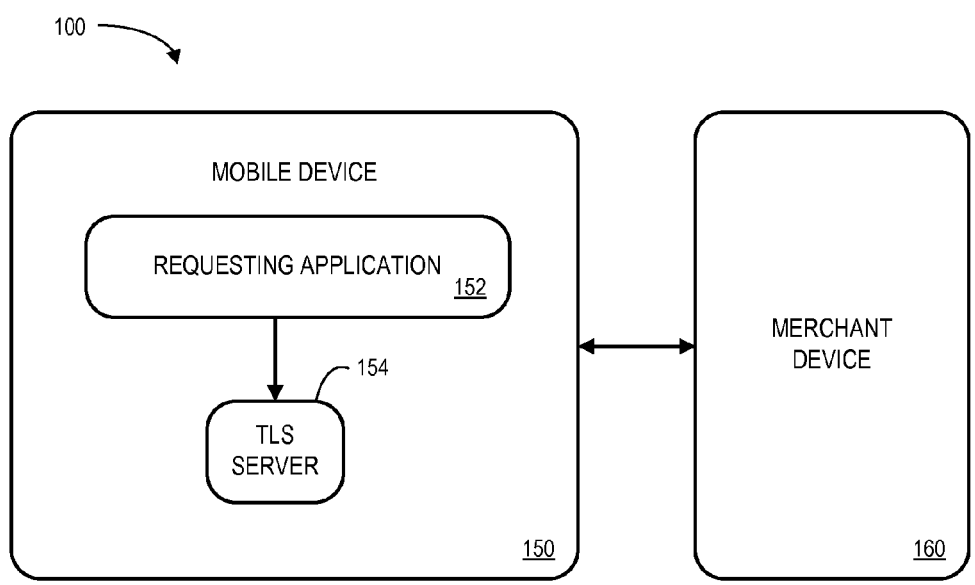
FIG. 1 is a block diagram overview of an online payment system.

FIG. 1 is a block diagram overview of an online payment 100 system. In particular, a mobile device 150 may exchange information with a merchant device 160 in connection with an online transaction. According to some embodiments, the mobile device 150 exchanges information with a remote merchant device 160 via a communication network, such as the Internet. For example, a user of the mobile device 150 may interact with a requesting application 152 (e.g., an application that can be used to make online purchases). As a result of the interaction, the mobile device 150 might transmit a credit card number and associated information to the merchant device 160 to complete the online transaction.

Because of the sensitive nature of the information being exchanged between the mobile device 150 and the merchant device 160, the mobile device 150 may include a Transport Layer Security ("TLS") server 154 to improve security. TLS is a cryptographic protocol that improves communication security over a network, such as the Internet, using key pairs to encrypt information. By way of example, a TLS protocol is defined by an Internet Engineering Task Force ("IETF") document in Request For Comment ("RFC") 5246 (August 2008) and RFC 6176 (March 2011). Some functions of the TLS server 154 including authenticating the certificate of the merchant device 160 (e.g., by verifying that a chain of certificates has not expired or been revoked) and providing a TLS key to the merchant device 160 (associated with a key pair used to encrypt and decrypt information exchanged during the session between the mobile device 150 and the merchant device 160).

Figure 2:
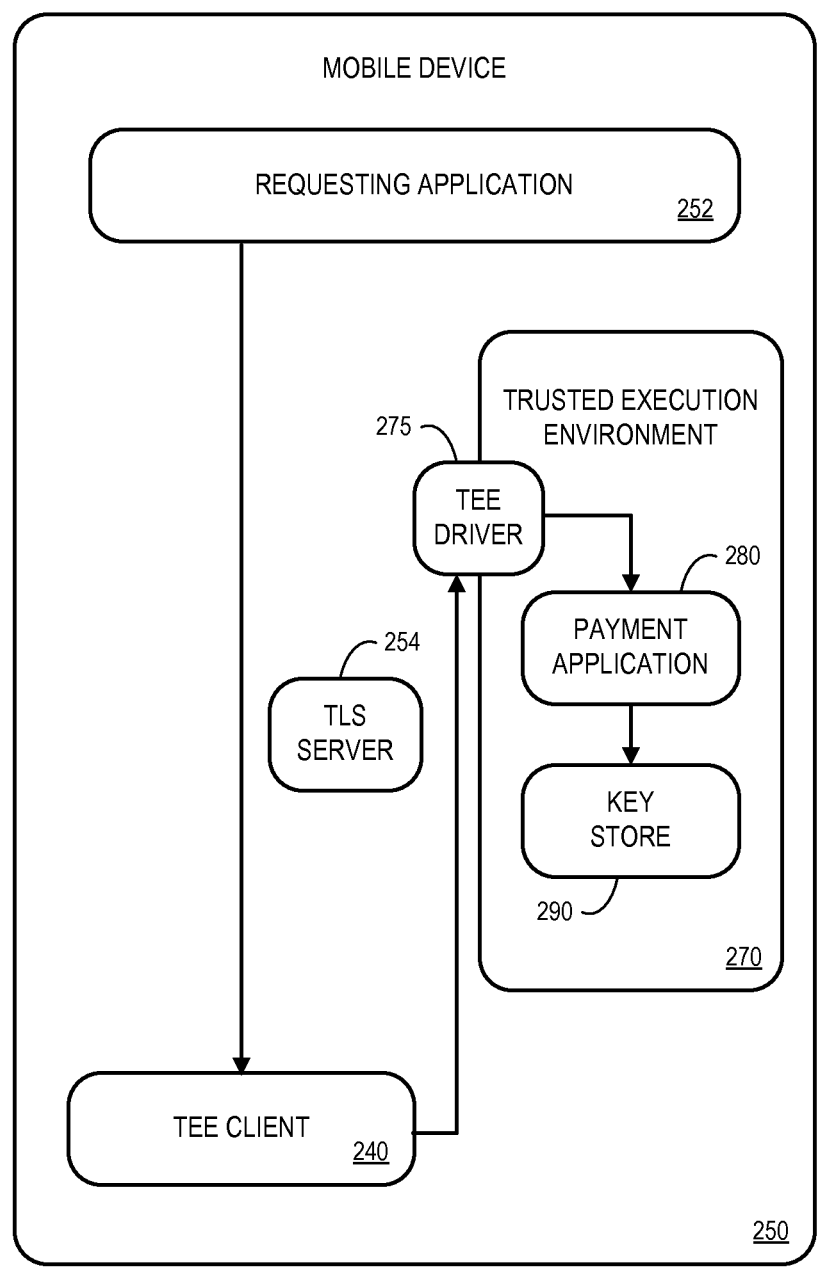
FIG. 2 is block diagram of a mobile device according to some embodiments of the present invention.

In some cases, however, it is known that the security of a TLS server 154 can be unknowingly compromised by malicious software. It would therefore be desirable to provide improved security for mobile devices and/or online transactions. FIG. 2 is block diagram of a mobile device 250 according to some embodiments of the present invention. As before, the mobile device 250 includes a requesting application 252 (e.g., an application that can be used to make online purchases) and a TLS server 254. The mobile device 250 might be, for example, associated with a smartphone, a tablet computer, a watch, an automobile, and/or a laptop computer. The requesting application 252 or other portions of the mobile device 250 may, according to some embodiments, be associated with a credit card company.

According to some embodiments, an "automated" mobile device 250 may facilitate secure online transactions associated with electronic commerce and/or Card Not Present ("CNP") transactions. For example, the mobile device 250 may automatically interact with other device in accordance with security protocols. As used herein, the term "automated" may refer to, for example, actions that can be performed with little (or no) intervention by a human.

As used herein, devices, including those associated with the mobile device 250 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks. Although a single mobile device 250 is shown in FIG. 2, any number of such devices may be included. Moreover, various devices described herein might be combined according to embodiments of the present invention.

According to some embodiments described herein, the mobile device 250 includes a Trusted Execution Environment ("TEE") 270. As used herein, the phrase "trusted execution environment" may refer to, for example, a secure area of a processor of a smartphone (or another connected device including tablets, watches, etc.). The trusted execution environment 270 may help ensure that code and data loaded inside the environment is protected with respect to confidentiality and integrity. The trusted execution environment 270 may provide security features such as isolated execution, integrity of trusted applications, and asset confidentiality. Note that the trusted execution environment 270 may offer an execution space that provides a higher level of security as compared to a rich mobile Operating System ("OS"). The trusted execution environment 270 may run in parallel with the mobile OS, and trusted applications running in the trusted execution environment 270 may have access to mobile device's main processor and memory.

The trusted execution environment 270 may include a payment application 280 that can receive requests from a TEE client 240 (outside of the trusted execution environment 270), via a TEE driver 275, and can interact with a key store 290. The payment application 280 might be associated with, for example, a payment card or account, such as a credit card, debit card, charge card, stored-value card, or prepaid card or nearly any other type of financial transaction card. Further, as used herein in, the term "issuer" may include, for example, a financial institution (i.e., bank) issuing a card, a merchant issuing a merchant specific card, a stand-in processor configured to act on-behalf of the card-issuer, or any other suitable institution configured to issue a payment identifier. As used herein, the term "transaction" can be associated with, for example, a merchant, a merchant terminal, an Automated Teller Machine ("ATM"), or any other suitable institution or device configured to initiate or process a financial transaction per the request of the account owner.

The requesting application 252 and/or payment application 280 may be associated with, for example, a "payment card processing system" or "credit card processing networks," such as the MasterCard® network that allows account owners to use payment accounts issued by a variety of issuers to shop at a variety of merchants. With this type of payment account, a card issuer, such as a bank, extends credit to an account owner to purchase products or services. When an account owner makes a purchase from an approved merchant or withdraws funds via an ATM, the card number and amount of the purchase, along with other relevant information, are transmitted via the processing network to a processing center, which verifies that the card has not been reported lost or stolen and that the card's credit limit has not been exceeded. In some cases, the account owner's signature is also verified, a personal identification number is required or other user authentication mechanisms are imposed. The account owner is required to repay the bank for the purchases or cash withdrawals, generally on a monthly basis.

Figure 3:
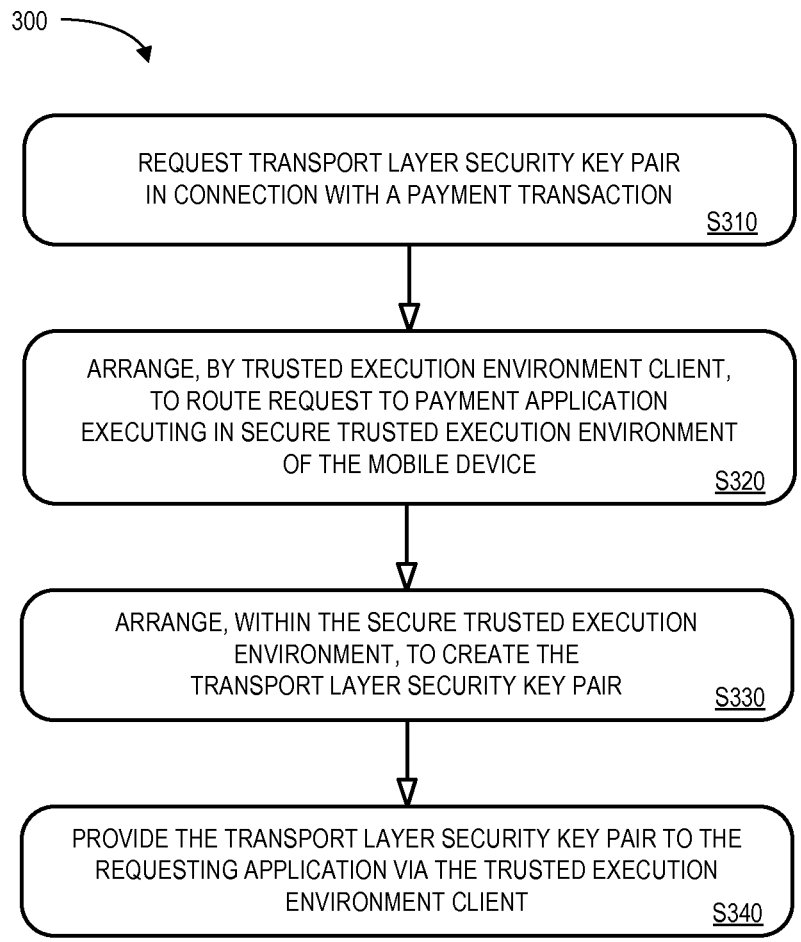
FIG. 3 illustrates a method that might be performed in accordance with some embodiments.

The trusted execution environment 270 may be used to improve security in connection with payments made with mobile device 250. FIG. 3 illustrates a method that might be performed by some or all of the elements of the system 200 described with respect to FIG. 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S310, a requesting application executing on a mobile device may request a TLS key pair in connection with a payment transaction. For example, a user of a mobile device may interact with a web browser to communicate with a merchant web site. In this case, the browser may request a TLS key pair to secure communications associated with the merchant's web site.

At S320, responsive to the request from the requesting application, a TEE client of the mobile device may arrange to route a request to a payment application executing in a secure trusted execution environment of the mobile device. According to some embodiments, the TEE client receives a request from a certificate manager via an open Secure Sockets Layer ("SSL") software stack of the mobile device. The certificate manager may, responsive to the request from the requesting application, arrange to validate a certificate chain associated with the request from the requesting application. According to some embodiments, the request from the requesting application is received via a secure Application Programming Interface ("API") associated with a web browser or other application.

Responsive to the request from the trusted execution environment client, at S330 it may be arranged, within the secure trusted execution environment, to create the TLS key pair. According to some embodiments, the TLS key pair is generated. Other embodiments may be associated with installation of the TLS key pair within the trusted execution environment when the mobile device was manufactured. At S340, the TLS key pair may be provided to the requesting application via the trusted execution environment client. The requesting application can then provide a key to the merchant web site, for example, and begin securely exchanging information.

Note that the embodiments described herein may be implemented using any number of different hardware configurations. For example, a mobile device might include a processor, such as one or more commercially available Central Processing Units ("CPUs") in the form of one-chip microprocessors, coupled to a communication device configured to communicate via a communication network. The communication device may be used to communicate, for example, a telephone or Wi-Fi network. The mobile device may further include an input device (e.g., a button or touchscreen) and an output device (e.g., speaker or display screen).

The processor may also communicates with a storage device, which may comprise any appropriate information storage device, including combinations of magnetic storage devices (e.g., a hard disk drive), optical storage devices, mobile telephones, and/or semiconductor memory devices. The storage device may store programs for controlling the processor. The processor performs instructions of the programs and thereby operates in accordance with any of the embodiments described herein. For example, a requesting application executing on a mobile device may request a transport layer security key pair in connection with a payment transaction. Responsive to the request, a trusted execution environment client of the mobile device may route a request to a payment application executing in a secure trusted execution environment of the mobile device. It may then be arranged, within the secure trusted execution environment, to create the transport layer security key pair and provide key pair to the requesting application. Moreover, in some embodiments, the mobile device may transmit payment transaction information to an access control server and receive a request for biometric authentication. It may then be arranged for hardware within the mobile device to biometrically authenticate a user of the mobile device.

The programs may be stored in a compressed, uncompiled and/or encrypted format. The programs may furthermore include other program elements, such as an operating system, a database management system, and/or device drivers used by the processor to interface with peripheral devices. As used herein, information may be "received" by or "transmitted" to, for example: (i) the mobile device from another device; or (ii) a software application or module within the mobile device from another software application, module, or any other source.

Figure 4:
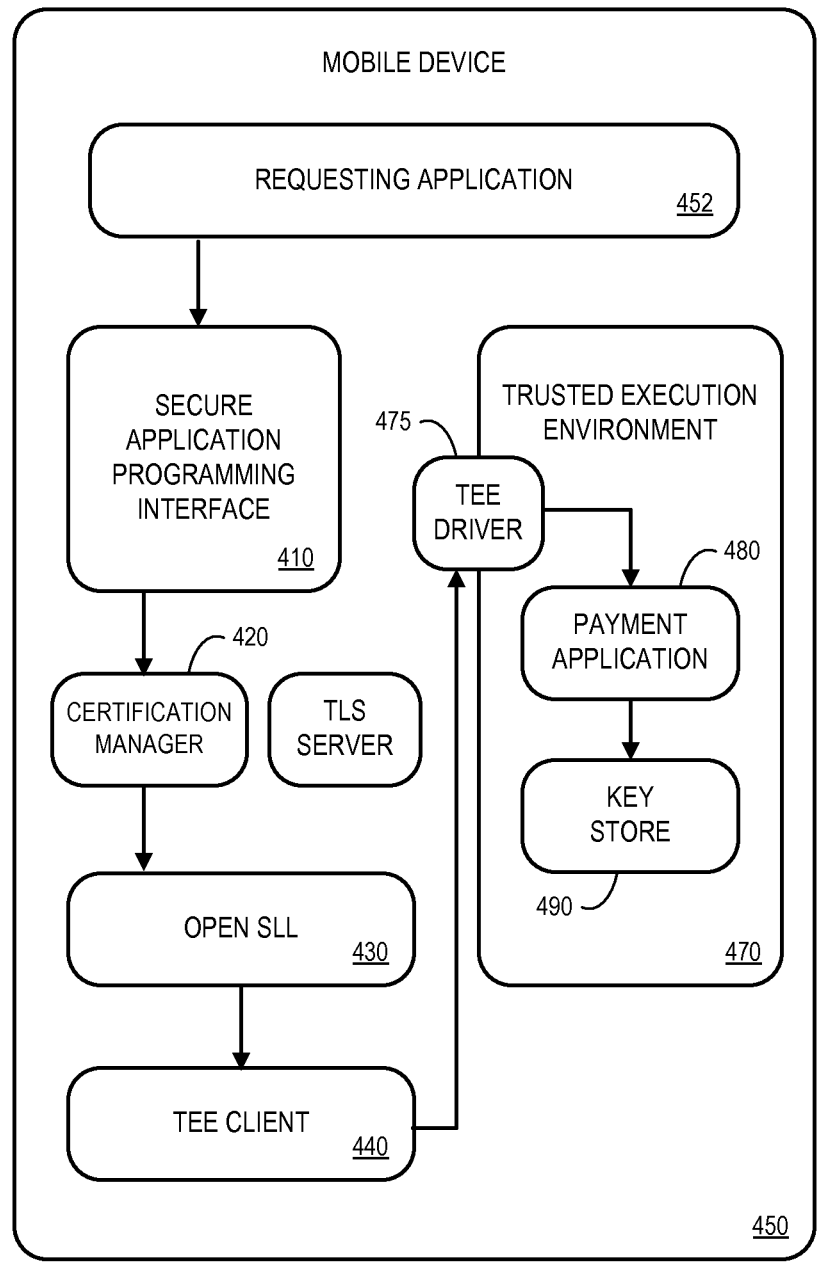
FIG. 4 is more detailed diagram of a mobile device according to some embodiments of the present invention.

FIG. 4 is more detailed diagram of a mobile device 450 according to some embodiments of the present invention. Note that enhanced web application security may be provided using a hardware toot of trust. In particular, a mobile application or browser acting as the requesting application 452 may present a certificate to a certificate manager 420 via a secure API 410. The certificate manager 420 may validate the certificate chain and send a request to a TEE client 440 via an open SSL 430 (e.g., associated with a native SSL library). The TEE client 440 authenticates the request and routes it to a secure payment application 480 running within the trusted execution environment 470 via a TEE driver 475. The payment application 480 may request key pair generation by a key store 490. A response may then be sent back to the requesting application 452 (running outside the trusted execution environment 470) including TLS keys. Note that the response may be routed in a similar fashion as the request (e.g., through the TEE client 440 via the TEE driver 475). A TLS key may then be used for communications between the mobile device 450 and a merchant's web backend. According to some embodiments, mutual authentication of a requesting party may be provided before TLS keys are generated. Further, a hardware signed certificate may be provided and/or self-signed certificates may be associated with any of the embodiments described herein.

Figure 5:
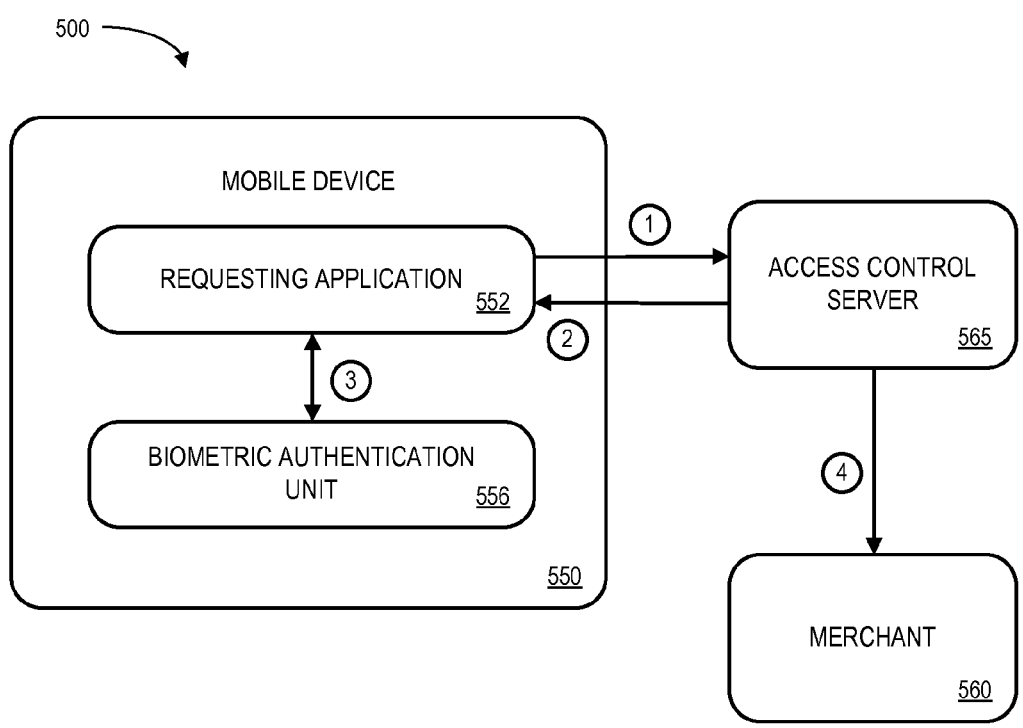
FIG. 5 is a block diagram overview of an online payment system in accordance with some embodiments.

FIG. 5 is a block diagram overview of an online payment system 500 in accordance with some embodiments. In some cases, an online payment may be associated with a Three Domain Secure ("3DS") protocol, which is an Extendable Markup Language ("XML") based protocol that acts as an additional security layer for online credit and debit card transactions. The 3DS protocol ties a financial authorization process with an online authentication associated with: (i) an acquirer domain (the merchant and the bank to which money is being paid), (ii) an issuer domain (the bank which issued the card being used), and an interoperability domain (the infrastructure provided by the card network). In the system 500 of FIG. 5, a requesting application 552 of a mobile device 550 may send payment information to an Access Control Server ("ACS") 565 (associated with the interoperability domain) during a checkout process at (1). The access control server 565 may respond with a challenge for the account holder at (2) to provide biometric verification of his or her presence at the mobile device 550. A biometric authentication unit 556 may perform this function at (3). By way of example, the biometric authentication unit 556 may be associated with a fingerprint scanner. Once authenticated, the access control server 565 may provide authenticated information to the merchant 560 at (4).

Such a biometric authentication approach might replace and/or improve password and/or Personal Identification Number ("PIN") approaches. Moreover, the improved security might reduce the chance of "unauthorized transaction" chargebacks to the merchant 560. Moreover, this approach may decrease the risk of unauthorized using payment cards fraudulently.

Figure 6:
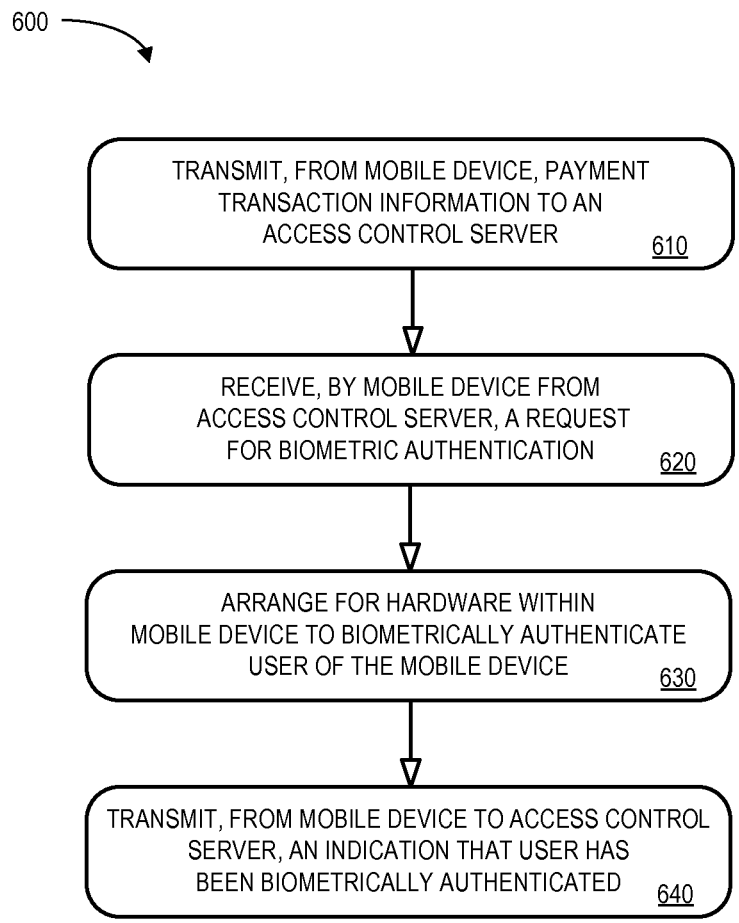
FIG. 6 illustrates a method that might be performed in accordance with some embodiments.

FIG. 6 illustrates a method that might be performed in accordance with some embodiments. At S610, payment transaction information is transmitted from a mobile device to an access control server. The mobile device may then receive, from the access control server, a request for biometric authentication (e.g., fingerprint identification) at S620. At S630, it may then be arranged for hardware within the mobile device to biometrically authenticate a user of the mobile device. The mobile device may then transmit, at S640, an indication that the user has been biometrically authenticated.

Figure 7:
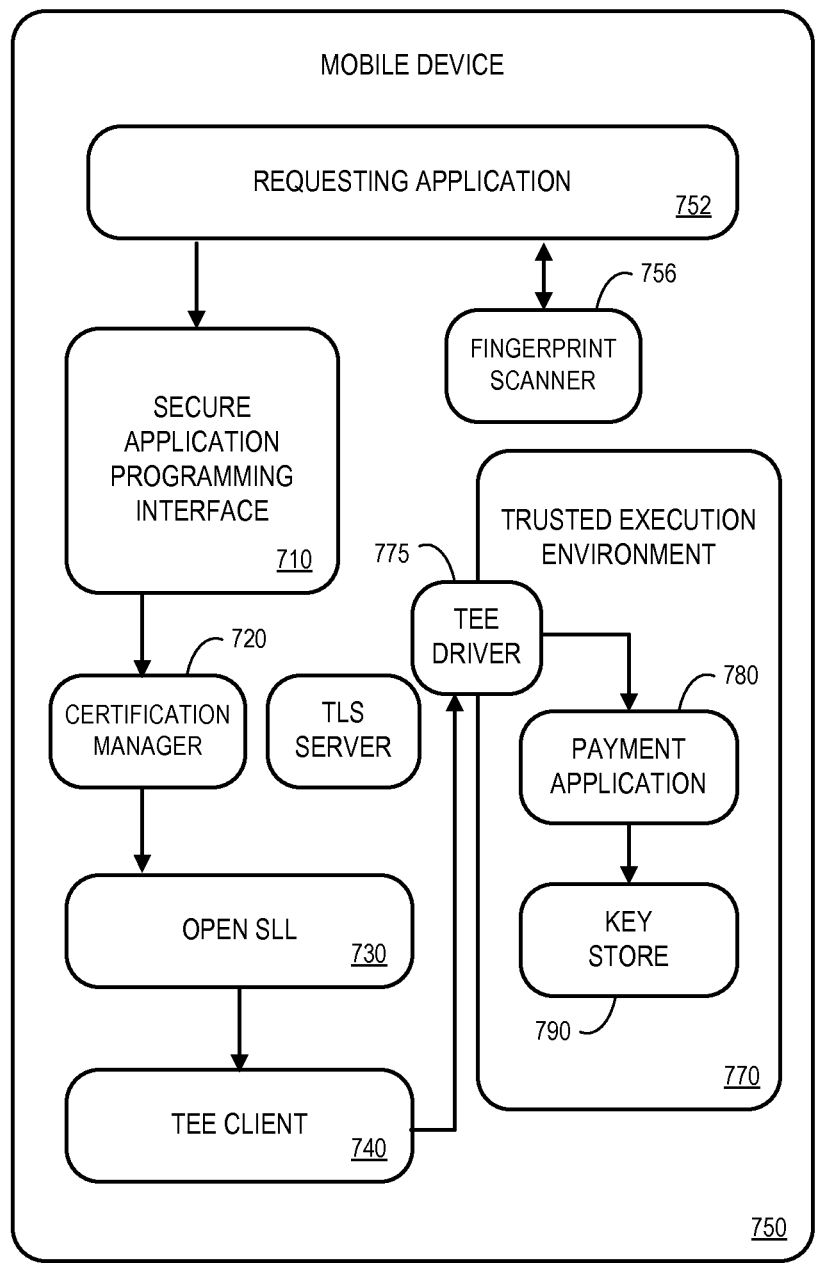
FIG. 7 is another diagram of a mobile device according to some embodiments of the present invention.

Note that processes of FIGS. 3 and 6 might be combined in a single device. For example, FIG. 7 is another diagram of a mobile device 750 according to some embodiments of the present invention. As before, a mobile application or browser acting as a requesting application 752 may present a certificate to a certificate manager 720 via a secure API 710. The certificate manager 720 may validate the certificate chain and send a request to a TEE client 740 via an open SSL 730 (e.g., associated with a native SSL library). The TEE client 740 authenticates the request and routes it to a secure payment application 780 running within a trusted execution environment 770 via a TEE driver 775. The payment application 780 may request key pair generation by a key store 790. A response may then be sent back to the requesting application 752 (running outside the trusted execution environment 770) including TLS keys. Note that the response may be routed in a similar fashion as the request (e.g., through the TEE client 740 via the TEE driver 775). A TLS key may then be used for communications between the mobile device 750 and a merchant's web backend.

Figure 8:
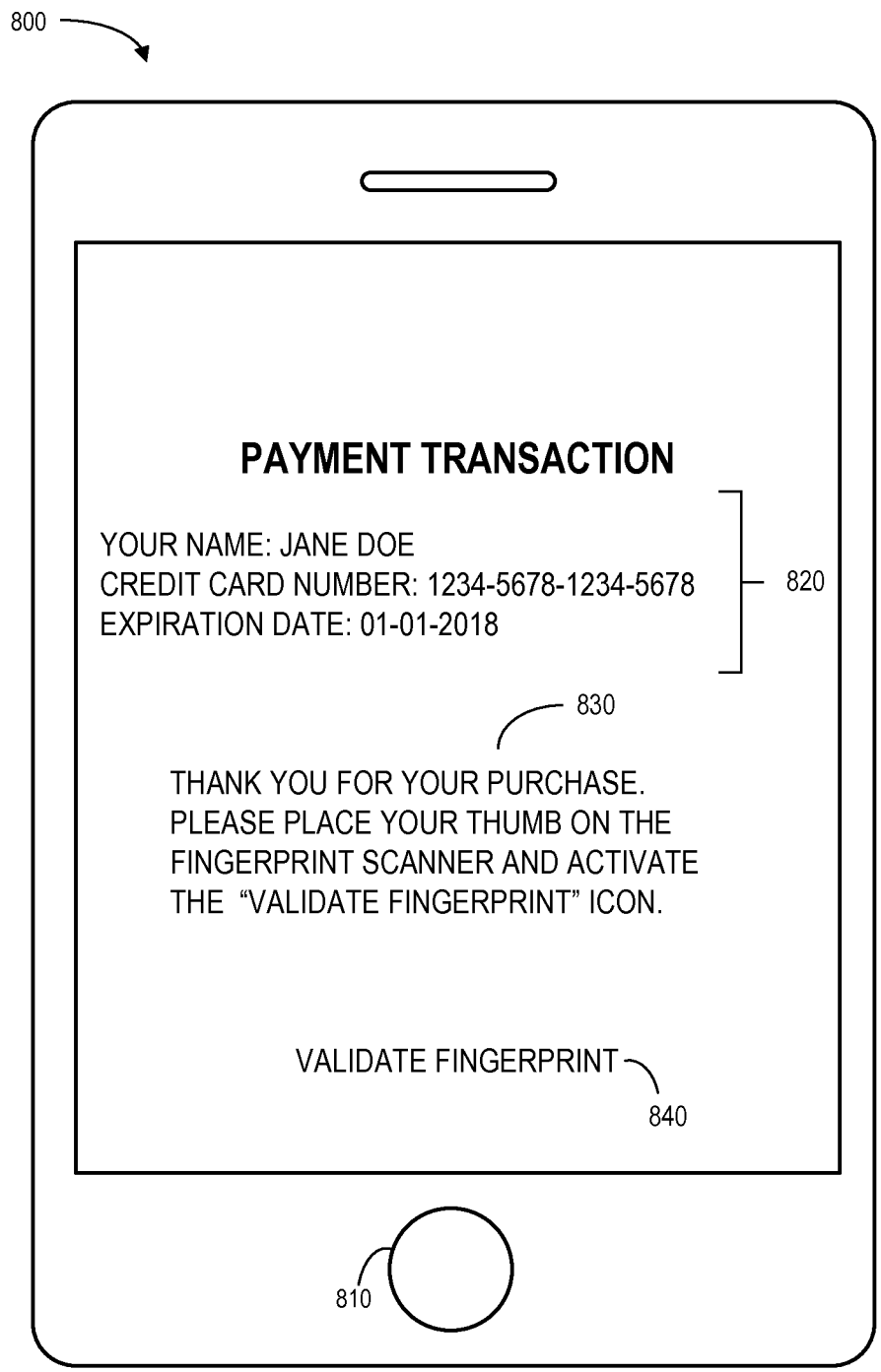
FIG. 8 is an example of a mobile device display that might be provided in accordance with some embodiments.

Moreover, during that process a user may be asked to biometrically authenticate his or her presence via a fingerprint scanner 756. For example, FIG. 8 is an example of a mobile device 800 display that might be provided in accordance with some embodiments. In this embodiment, the mobile device 800 includes a fingerprint scanner 810. The display might include payment account details 830 along with instructions 830 asking the user to place his or her thumb on the fingerprint scanner 810 and to activate an icon 840 on the display. When the user is authenticated, the payment transaction with the merchant is executed. Although some embodiments have been described with respect to online purchases, note that any of the embodiments provided herein may be associated with a mobile device for a Point Of Sale ("POS") transaction.

Thus, embodiments may provide for trusted execution environment generated TLS keys (securing the transport layer). Moreover, adding biometric authentication to the 3DS protocol may allow for stronger user authentication compared to PIN or password verification. Together, these approaches may provide a substantially high overall level of security for an ecommerce ecosystem.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer-implemented method, comprising:
   requesting within a mobile device, by a requesting application executing on the mobile device, a Transport Layer Security ("TLS") key pair at least for encrypting and decrypting information in connection with a payment transaction;
   responsive to the request from the requesting application, arranging, by a trusted execution environment client of the mobile device, to route a request to a payment application executing in a secure trusted execution environment of the mobile device;
   responsive to the request from the trusted execution environment client, providing, within the secure trusted execution environment, the TLS key pair using a key store and the payment application; and forwarding the TLS key pair to the requesting application via the trusted execution environment client.

2. The method of claim 1, further comprising:
transmitting, from the mobile device, payment transaction information to an access control server;
receiving, by the mobile device from the access control server, a request for biometric authentication;
arranging for hardware within the mobile device to biometrically authenticate a user of the mobile device; and
transmitting, from the mobile device to the access control server, an indication that the user has been biometrically authenticated.

3. The method of claim 2, wherein the biometric authentication comprises fingerprint identification.

4. The method of claim 1, wherein the mobile device comprises one of: (i) a smartphone, (ii) a tablet computer, (iii) a watch, (iv) an automobile, and (v) a laptop computer.

5. The method of claim 1, wherein the payment transaction comprises one of: (i) a credit card payment transaction, and (ii) a debit card payment transaction.

6. The method of claim 1, wherein the trusted execution environment client and payment application communicate via a trusted execution environment driver.

7. The method of claim 1, wherein creation of said TLS key pair is associated with at least one of: (i) generation of the TLS key pair in substantially real time, and (ii) installation of the TLS pair within the trusted execution environment when the mobile device was manufactured.

8. The method of claim 1, wherein the trusted execution environment client receives a request from a certificate manager via an open secure sockets layer software stack of the mobile device.

9. The method of claim 8, wherein the certificate manager, responsive to the request from the requesting application, arranges to validate a certificate chain associated with the request from the requesting application.

10. The method of claim 9, wherein the request from the requesting application is received via a secure application programming interface associated with a web browser.

11. The method of claim 1, wherein the provided TLS key pair is generated in the secure trusted execution environment during operation of the mobile device.

12. The method of claim 1, wherein the provided TLS key pair is installed in the secure trusted execution environment during manufacturing of the mobile device.

13. A non-transitory, computer-readable medium having stored therein instructions that, upon execution, cause a computer processor to perform a method, the method comprising:
requesting within a mobile device, by a requesting application executing on the mobile device, a Transport Layer Security ("TLS") key pair at least for encrypting and decrypting information in connection with a payment transaction;
responsive to the request from the requesting application, arranging, by a trusted execution environment client of the mobile device, to route a request to a payment application executing in a secure trusted execution environment of the mobile device;
responsive to the request from the trusted execution environment client, providing, within the secure trusted execution environment, the TLS key pair using a key store and the payment application; and
forwarding the TLS key pair to the requesting application via the trusted execution environment client.

14. The medium of claim 13, wherein the method further comprises:
transmitting, from the mobile device, payment transaction information to an access control server;
receiving, by the mobile device from the access control server, a request for biometric authentication;
arranging for hardware within the mobile device to biometrically authenticate a user of the mobile device; and
transmitting, from the mobile device to the access control server, an indication that the user has been biometrically authenticated.

15. The medium of claim 14, wherein the biometric authentication comprises fingerprint identification.

16. The medium of claim 13, wherein the trusted execution environment client and payment application communicate via a trusted execution environment driver.

17. The medium of claim 16, wherein creation of said TLS key pair is associated with at least one of: (i) generation of the TLS key pair in substantially real time, and (ii) installation of the TLS key pair within the trusted execution environment when the mobile device was manufactured.

18. The medium of claim 17, wherein the trusted execution environment client receives a request from a certificate manager via an open secure sockets layer software stack of the mobile device.

19. A mobile device, comprising:
a requesting application to issue a request within the mobile device for a Transport Layer Security ("TLS") key pair at least for encrypting and decrypting information in connection with a payment transaction;
a trusted execution environment client to, responsive to the request from the requesting application, arrange to route a request;
a secure trusted execution environment, including:
a payment application to receive the request from the trusted execution environment client, and
a key store to provide the TLS key pair by the payment application to be forwarded to the requesting application via the trusted execution environment client.

20. The mobile device of claim 19, wherein the requesting application is further to (i) transmit payment transaction information to an access control server, (ii) receive from the access control server a request for biometric authentication, and the mobile device further comprising:
a biometric authentication unit configured to biometrically authenticate a user of the mobile device.

21. The mobile device of claim 20, wherein the biometric authentication unit comprises a fingerprint identification unit.

22. The mobile device of claim 19, wherein the mobile device comprises one of: (i) a smartphone, (ii) a tablet computer, (iii) a watch, (iv) an automobile, and (v) a laptop computer.

23. The mobile device of claim 19, further comprising;
a trusted execution environment driver to facilitate communication between the trusted execution environment client and the payment application within the secure trusted execution environment of the mobile device.

* * * * *